United States Patent
Danz

(10) Patent No.: US 9,676,328 B2
(45) Date of Patent: Jun. 13, 2017

(54) METHOD AND DEVICE FOR DETECTING A COLLISION BETWEEN A VEHICLE AND AN OBJECT USING A MOBILE USER TERMINAL WHICH IS ABLE TO BE COUPLED TO THE VEHICLE

(71) Applicant: Robert Bosch GmbH, Stuttgart (DE)

(72) Inventor: Christian Danz, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/893,985

(22) PCT Filed: May 6, 2014

(86) PCT No.: PCT/EP2014/059159
§ 371 (c)(1),
(2) Date: Nov. 25, 2015

(87) PCT Pub. No.: WO2014/191166
PCT Pub. Date: Dec. 4, 2014

(65) Prior Publication Data
US 2016/0101732 A1 Apr. 14, 2016

(30) Foreign Application Priority Data
May 29, 2013 (DE) .......................... 10 2013 209 999

(51) Int. Cl.
*B60Q 1/00* (2006.01)
*B60Q 9/00* (2006.01)
(Continued)

(52) U.S. Cl.
CPC ......... *B60Q 9/008* (2013.01); *G06K 9/00805* (2013.01); *G06K 9/00845* (2013.01);
(Continued)

(58) Field of Classification Search
CPC ............... B60Q 9/008; G06K 9/00805; G06K 9/00845; G08G 1/166; H04M 1/72538; G08B 21/06
See application file for complete search history.

(56) References Cited

U.S. PATENT DOCUMENTS 8,340,902 B1 * 12/2012 Chiang ................ G05D 1/0044
340/425.5
2006/0103513 A1 * 5/2006 Ihara ........................ H04M 1/04
340/435
(Continued)

FOREIGN PATENT DOCUMENTS

DE  60 2004 003 596  9/2007
DE  10 2007 054 738  5/2009
(Continued)

OTHER PUBLICATIONS

International Search Report for PCT/EP2014/059159, dated Jul. 21, 2014.

*Primary Examiner* — Erin File
(74) *Attorney, Agent, or Firm* — Norton Rose Fulbright US LLP; Gerard Messina

(57) ABSTRACT

In a method for detecting a collision between a vehicle and an object using a mobile user terminal which is able to be coupled to the vehicle, a user terminal signal for detecting the object is read in, which user terminal signal represents a signal which is provided by an image sensor of the user terminal; a driving state signal is read in to detect a driving state of the vehicle, which driving state signal represents a measured variable output by a vehicle sensor via an interface between the user terminal and the vehicle and/or output by an acceleration sensor of the user terminal; and a collision signal is ascertained to indicate an imminent collision (Continued)

between the vehicle and the object, based on the user terminal signal and the driving state signal.

9 Claims, 3 Drawing Sheets

(51) Int. Cl.
*G08G 1/16* (2006.01)
*H04M 1/725* (2006.01)
*G06K 9/00* (2006.01)
*G08B 21/06* (2006.01)

(52) U.S. Cl.
CPC ........ *G08G 1/166* (2013.01); *H04M 1/72538* (2013.01); *G08B 21/06* (2013.01)

(56) References Cited

U.S. PATENT DOCUMENTS

| | | |
|---|---|---|
| 2007/0222617 A1 | 9/2007 | Chai et al. |
| 2011/0169626 A1 | 7/2011 | Sun et al. |
| 2011/0227713 A1* | 9/2011 | Amann ............. B60W 30/0953 340/435 |
| 2011/0304444 A1 | 12/2011 | Zhang et al. |
| 2016/0107595 A1* | 4/2016 | Rosenbaum ...... B60W 30/0956 348/148 |

FOREIGN PATENT DOCUMENTS

| | | |
|---|---|---|
| DE | 10 2010 047 411 | 5/2011 |
| WO | WO 2011/042876 | 4/2011 |

* cited by examiner

METHOD AND DEVICE FOR DETECTING A COLLISION BETWEEN A VEHICLE AND AN OBJECT USING A MOBILE USER TERMINAL WHICH IS ABLE TO BE COUPLED TO THE VEHICLE

BACKGROUND OF THE INVENTION

1. Field of the Invention

The present invention relates to a method for detecting a collision between a vehicle and an object with the aid of a mobile user terminal which is able to be coupled to the vehicle; it also relates to a corresponding computer program product, a corresponding device, and a mobile user terminal, which can be coupled to a vehicle.

2. Description of the Related Art

Modern mobile user terminals, such as a smartphones, are equipped with a multitude of sensors, which can be utilized for a driver assistance functionality for assisting a driver of a vehicle.

The published German patent application document DE 60 2004 003 596 T2 describes a conventional system for using a mobile user terminal in a vehicle.

BRIEF SUMMARY OF THE INVENTION

Against this background, an improved method and an improved device for detecting a collision between a vehicle and an object, a corresponding computer program product and an improved mobile user terminal which is able to be coupled to the vehicle are provided.

A mobile user terminal such as a smartphone may have a sensor which can be utilized for detecting a collision danger for a vehicle. A signal from the sensor is advantageously combinable with data pertaining to a driving state of the vehicle in order to detect the collision risk. According to different specific embodiments, driving state data, such as from a further sensor of the mobile user terminal, can be provided or be read in via an external interface of the mobile user terminal. A data transmission between the mobile user terminal and a device of the vehicle, for instance, is realizable via such an external interface.

A method is provided for detecting a collision between a vehicle and an object with the aid of a mobile user terminal which is able to be coupled to the vehicle, the method including the following steps:

Reading in a user terminal signal in order to detect the object, the user terminal signal representing a signal provided by an image sensor of the user terminal;

reading in a driving state signal in order to detect a driving state of the vehicle, the driving state signal representing a measured variable which is output by a vehicle sensor via an interface between the user terminal and the vehicle and/or an acceleration sensor of the user terminal; and ascertaining a collision signal in order to indicate an imminent collision between the vehicle and the object with the aid of the user terminal signal and the driving state signal.

In general, a mobile user terminal describes a mobile telephone, in particular a smartphone, a tablet computer, or a personal digital assistant (PDA). The mobile user terminal may have its own energy supply, for instance an accumulator. The mobile user terminal can include a housing, so that it is possible to hold the mobile user terminal in the hand. For instance, the housing may have a length of less than 15 cm, a width of less than 10 cm, and a thickness of less than 3 cm and include an integrated screen. A mobile user terminal of this type may be characterized by a location-independent availability of PIM data (Personal Information Manager) and by at least one interface for the data transmission, such as for telecommunications services.

It is possible that the mobile user terminal has a mechanical coupling device for attaching the mobile user terminal to a structure of the vehicle in a reversible manner. The mobile user terminal is able to be rigidly mounted on the vehicle via the mechanical coupling device, so that an acceleration of the vehicle is transmittable to the mobile user terminal without any time lag.

An image sensor could describe a camera of the user terminal, for instance. The image sensor may be integrated in the user terminal in an especially space-saving manner. When linked to the vehicle, the mobile user terminal is alignable in such a way that the image sensor is capable of detecting an environment that is situated in front of the vehicle. Such an image sensor can be used for recording images of an object that is situated in the surrounding area of the vehicle, such as images of a vehicle traveling ahead. In particular a distance of the vehicle from the object can be ascertained with the aid of these images. The user terminal signal may include information about the object, such as the distance or a relative velocity between the vehicle and the object.

The driving state signal can include information about the driving state of the vehicle, such as a current driving state of the vehicle. The driving state, for example, may relate to a speed or a driving direction or to a change in the speed or driving direction, for instance. According to different specific embodiments, the driving state is ascertainable with the aid of a sensor integrated in the mobile user terminal or with the aid of a vehicle sensor integrated in the vehicle.

For instance, a vehicle sensor may be a speed sensor, an acceleration sensor, or a brake pressure or steering angle sensor of the vehicle. The vehicle sensor may advantageously be used for ascertaining a driving state of the vehicle, such as an acceleration or braking operation or a steering motion.

An interface can be realized in the form of a plug connector, for example, or a radio signal transmitter integrated into the user terminal. Accordingly, it is possible to establish a connection between the vehicle sensor or a transmission device of the vehicle and the interface via a data cable or also in a wireless manner via a radio signal. The interface can be used to link the user terminal to the vehicle sensor or an evaluation device for analyzing a signal from the vehicle sensor in an especially reliable and uncomplicated manner.

In addition or as an alternative, the driving state is ascertainable by an acceleration sensor of the mobile user terminal. An acceleration sensor, for instance, may describe a 6-D or 9-D acceleration sensor integrated into the user terminal. If the mobile user terminal is rigidly coupled to the vehicle, the acceleration sensor of the mobile device is able to detect a deceleration of the vehicle in a precise and reliable manner.

The collision signal is ascertainable by combining the user terminal signal and the driving state signal. This may be done with the aid of a logic unit, such as a processor, of the mobile user terminal.

The described approach may utilize the fact that high-resolution cameras having a resolution of at least 8 megapixels are frequently integrated into the mobile user terminals, such as conventional smartphones. Using a mount, such smartphones can be mounted on a windshield in a vehicle interior, for example, such that the camera is pointing forward in the driving direction and is able to record and analyze images in front of the vehicle. The images recorded by the camera may be used for realizing driver assistance functionalities, for instance what is known as a forward collision warning (predictive collision warning) or FCW in abbreviated form. To do so, a GPS signal from a GPS receiver or a corresponding signal from another locating system also may be utilized for acquiring velocity information of the vehicle. Based on the own velocity of the vehicle and a distance from a vehicle driving ahead or an object, such as a pedestrian, which is ascertained with the aid of the camera of the mobile device, a time until a collision occurs, also known as time to collision or TTC, is able to be determined and a multi-stage warning can be output to a driver in case of a looming collision.

According to one specific embodiment, vehicle data such as the speed, acceleration and other signals available in the vehicle, e.g., on a CAN bus of the vehicle, are transmittable to the mobile user terminal via the interface of the mobile device, so that a performance of a driver assistance functionality realized on the user terminal is able to be improved. Such a linkage of the user terminal and the vehicle data makes it possible to avoid faulty warnings of the driver assistance function, which can increase the acceptance of the driver assistance functionality.

According to one specific embodiment of the provided approach, in the step of the ascertaining a collision danger may be ascertained using the user terminal signal, and the collision danger be plausibilized with the aid of the driving state signal in order to ascertain the collision signal. This makes it possible to determine the collision danger with a particularly high degree of reliability, and faulty warnings are avoidable.

Furthermore, the method may include a step of providing a warning signal using the collision signal in order to output a collision warning via the user terminal. For example, a collision warning could be an acoustic signal or a warning message which is displayed on a screen of the user terminal. The warning signal provides the opportunity of making the driver aware of the collision danger in an especially rapid manner, so that the driver is able to react in time to avoid a collision.

The method may include a step of reading in an image signal in order to detect a state of a driver. The image signal can represent a signal that is output by a further image sensor of the user terminal. In addition, the step of providing the warning signal may be implemented as a function of the image signal. An image signal in general refers to an image of the driver, in particular the driver's face, which is recorded by a camera of the user terminal facing the driver and then analyzed. For example, the image signal may image eye blinking or a viewing direction of the driver. The use of the image signal enables an even earlier output of the collision warning, for instance when the driver is fatigued or inattentive.

According to one further specific embodiment of said approach, the method may include a step of reading in a telephoning signal, which may represent an active telephone connection of the user terminal. In response to the telephoning signal, the warning signal is able to be output ahead of time in the step of providing. In a similar manner as the image signal pertaining to the driver, the telephoning signal makes it possible to estimate an attentiveness of the driver with regard to the driving task to be managed. A collision risk can be reduced further in this way.

In addition, the method may include a step of providing an activation signal to the interface between the user terminal and the vehicle with the aid of the collision signal in order to activate a vehicle safety system. A vehicle safety system, for example, may refer to an automatic emergency braking functionality, a lane keeping assistant, an adaptive cruise control system, a speed restriction assistant, a restraining system or other safety systems of the vehicle, in particular predictive systems, which are able to be activated as a function of the collision signal. Such a step makes it possible to further increase the safety of the driver.

Also advantageous is a computer program product having program code, which may be stored on a machine-readable medium such as a semiconductor memory, a hard disk memory or an optical memory, and be used for carrying out the method according to one of the afore-described specific embodiments when the program product is executed on a computer or a device.

A device for detecting a collision between a vehicle and an object using a mobile user terminal which is able to be linked to the vehicle has the following features:

a read-in unit for reading in a user terminal signal for detecting the object, the user terminal signal representing a signal supplied by an image sensor of the user terminal;

a further read-in unit for reading in a driving state signal for detecting a driving state of the vehicle, the driving state signal representing a measured variable which is output by a vehicle sensor via an interface between the terminal and the vehicle and/or an acceleration sensor of the user terminal; and an ascertainment unit for ascertaining a collision signal in order to indicate an imminent collision between the vehicle and the object using the user terminal signal and the driving state signal.

The device may be fully integrated into the mobile user terminal. In the present case, a device may be understood to refer to an electrical device which processes sensor signals and outputs control signals and/or data signals as a function thereof. The device may include an interface developed in the form of hardware and/or software. In a hardware implementation, for example, the interface may be part of a what is known as a system ASIC which encompasses the most varied functionalities of the device. However, it is also possible for the interface to be a separate integrated switching circuit or to be made up at least partially of discrete components. In a software implementation, the interface can be a software module, which is present on a microcontroller, for example, in addition to other software modules. A read-in unit, a further read-in unit, and an ascertainment unit furthermore can be understood to describe an electrical control unit, which processes sensor signals and outputs control and/or data signals as a function thereof. With the aid of the device the objective on which the current approach is based can be attained in a rapid and efficient manner.

Finally, the present approach provides a mobile user terminal, which is linkable to a vehicle, the mobile user terminal having the following features:

A device for detecting a collision between a vehicle and an object using the mobile user terminal, according to one specific embodiment introduced here;

an image sensor for reading in the user terminal signal in order to detect the object; and an interface for reading in the driving state signal in order to detect a driving state of the vehicle, the driving state signal representing a measured variable which is output by a vehicle sensor of the vehicle and/or an acceleration sensor of the user terminal.

Such a mobile user terminal makes it possible to realize the objective on which the described approach is based in a manner that is especially compact and efficient.

In the following text the present invention will be explained in greater detail by way of example with reference to the attached drawing.

DETAILED DESCRIPTION OF THE INVENTION

Figure 1:
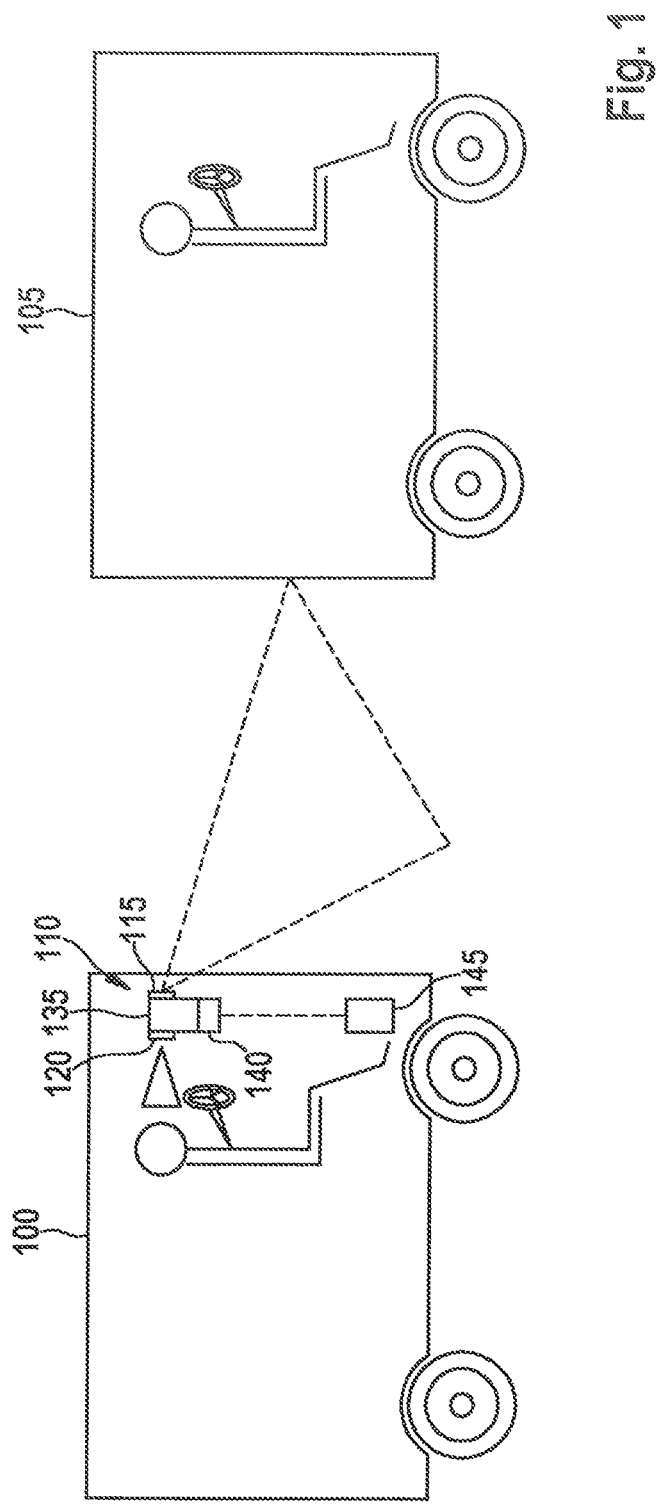
FIG. 1 shows a schematic representation of a looming collision between a vehicle and a further vehicle, the vehicle being linked to a mobile user terminal according to one specific embodiment according to the present invention.

In the subsequent description of advantageous exemplary embodiments of the present invention, the same or similar reference numerals are used for the elements that are shown in the various figures and act similarly, and a repeated description of these elements has been dispensed with.

FIG. 1 shows a schematic representation of a looming collision between a vehicle 100 and an object 105 according to one specific embodiment of the present invention. In this exemplary embodiment, object 105 by way of example is a further vehicle 105, which is traveling in front of vehicle 100. A mobile user terminal 110, for instance a smartphone, is situated inside vehicle 100, between a driver and a windshield. Mobile user terminal 110, also referred to as mobile device, may be mounted on the windshield or a dashboard of vehicle 100 with the aid of a suitable mount, for instance, so that the driver is able to view a screen of user terminal 110. Mobile user terminal 110 may be detached from the mount in vehicle 100 and used independently of vehicle 100, for instance outside vehicle 100, such as for conducting telephone calls, using Internet services, or for navigation purposes.

Mobile user terminal 110 includes a first image sensor 115 and—optionally—a further image sensor 120. Mobile user terminal 110 is placed in such a way that image sensor 115 is pointing in the direction of further vehicle 105. Image sensor 115 is developed to provide a user terminal signal for ascertaining a distance between vehicle 100 and further vehicle 105. The user terminal signal may represent an image signal acquired by first image sensor 115 or be based on such an image signal. Further image sensor 120 is pointing toward the face of the driver, and is developed to provide an image signal for detecting a state of the driver, such as a degree of alertness.

A radio antenna 135, which enables mobile user terminal 110 to establish a wireless connection, such as for a voice transmission, is shown schematically at an upper end of user terminal 110.

According to one exemplary embodiment, mobile user terminal 110 has an interface 140 to a vehicle sensor 145. Interface 140 is designed to receive a driving state signal, which may include vehicle data or operating data of vehicle 100, from vehicle sensor 145 or from a processing device coupled to vehicle sensor 145, or an evaluation device, by way of a connected data cable or a wireless radio connection.

The user terminal signal output by image sensor 115, and the driving state signal output by vehicle sensor 145 are read in by mobile user terminal 110 and combined with each other in order to ascertain a collision risk between vehicle 100 and vehicle 105 driving ahead. Mobile user terminal 110 is designed to ascertain a collision signal based on the user terminal signal and the driving state signal, in the event that a risk of a collision exists between vehicle 100 and further vehicle 105. The collision signal may be used to provide a warning signal in order to output a collision warning to the driver via user terminal 110, for instance in the form of a warning sound and/or a warning message, to which the driver can respond accordingly.

According to one exemplary embodiment, monitoring of the driver state takes place in addition via further image sensor 120. If it is determined when using the image signal of further image sensor 120 that the driver is fatigued or inattentive, the warning signal is able to be provided even earlier, so that the driver is able to respond to the collision warning in a timely manner.

According to one exemplary embodiment, the driving state signal may be supplied by a sensor which is integrated into mobile user terminal 110, in particular by an acceleration sensor, either additionally or alternatively. Interface 140 may be optional in such a case.

Figure 2:
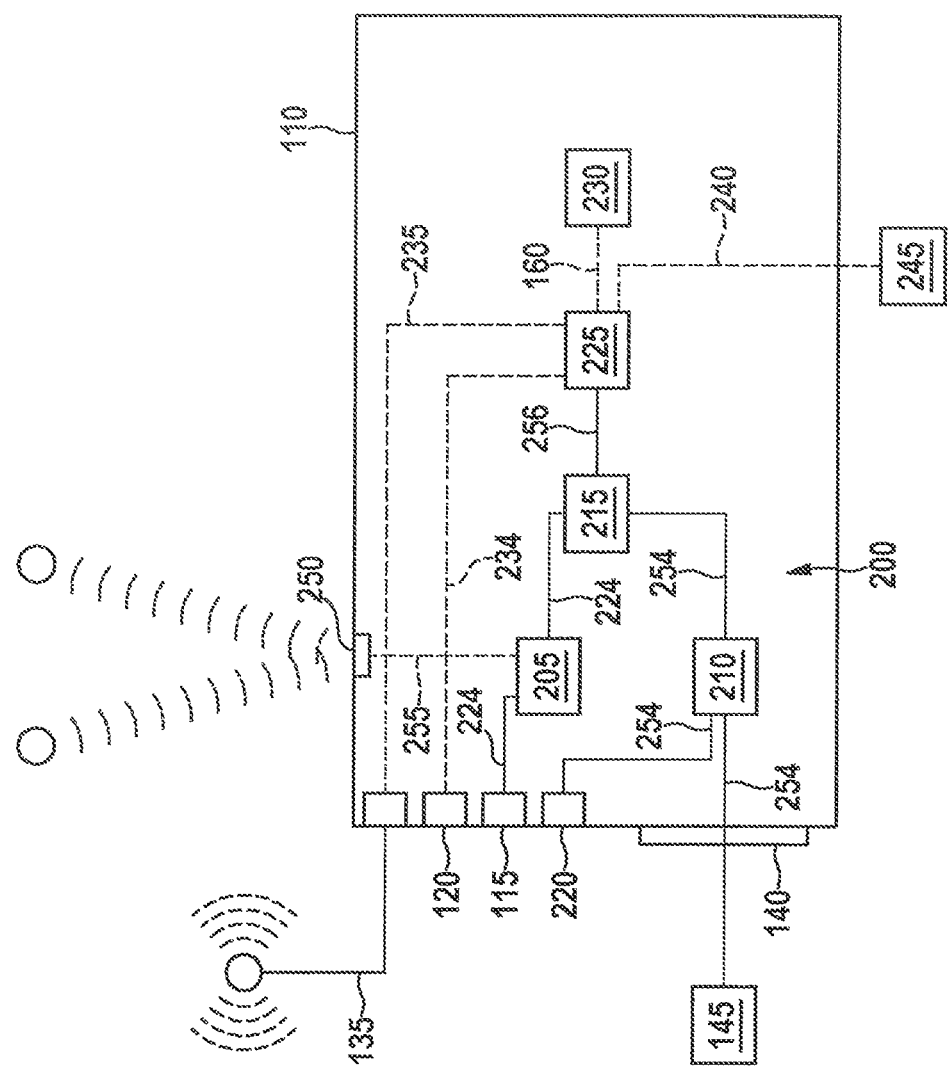
FIG. 2 shows a schematic illustration of a mobile user terminal according to one exemplary embodiment of the present invention.

FIG. 2 shows a mobile user terminal 110 according to one exemplary embodiment of the present invention. Mobile user terminal 110 may be mobile user terminal 110 illustrated in FIG. 1. Mobile user terminal 110 has a mechanical interface, via which mobile user terminal 110 can be mounted on a vehicle.

As already described on the basis of FIG. 1, mobile user terminal 100 according to one exemplary embodiment includes an image sensor 115, a further image sensor 120, a radio antenna 135, and an interface 140 for linking mobile user terminal 100 to the vehicle. Image sensors 115, 120 may realize a camera functionality. Image sensor 115 is designed to provide a user terminal signal 224. Further image sensor 120 is designed to provide an image signal 234. Via interface 140, a driving state signal 254 from a vehicle sensor 145 of the vehicle, for instance, is able to be received.

Mobile user terminal 110 includes a device 200 for detecting a collision between the vehicle and an object. Device 200 may also be referred to as smartphone forward collision warning driver assistance system, smartphone-FCW, smartphone FCS system or, in abbreviated form, as system.

Device 200 includes a read-in unit 205 for reading in user terminal signal 224, a further read-in unit 210 for reading in driving state signal 254, and an ascertainment unit 215 for ascertaining a collision signal 256. Read-in unit 205 is connected to image sensor 115. Further read-in unit 210 is connected to vehicle sensor 145 via interface 140 integrated into user terminal 110, vehicle sensor 145 being situated outside of user terminal 110 in vehicle 100. Moreover, read-in unit 205 and further read-in unit 210 are linked to ascertainment unit 215 in each case.

According to one exemplary embodiment, user terminal 110 has an acceleration sensor 220, which is designed to detect a braking or acceleration operation of the vehicle, using the mechanical link between mobile user terminal 110 and the vehicle. Acceleration sensor 220 is connected to further read-in unit 210. Depending on the exemplary embodiment, further read-in unit 210 may be designed to receive a driving state signal 254 from acceleration sensor 220 and, additionally or alternatively, a driving state signal 254 from vehicle-internal vehicle sensor 145 via interface 140.

Ascertainment unit 210 is designed to ascertain collision signal 256 with the aid of user terminal signal 224 supplied by read-in unit 205, and driving state signal 254 supplied by further read-in unit 210, provided user terminal signal 224 and driving state signal 254 lead to the conclusion that a collision is looming between vehicle 100 and an object acquired by image sensor 115. For an even more efficient determination of collision signal 256, ascertainment unit 215 may be designed to ascertain a collision risk by using user terminal signal 115 and to plausibilize it using driving state signal 254.

According to one exemplary embodiment of the present invention, device 200 is designed to ascertain a warning signal 160 on the basis of collision signal 256. To do so, device 200 may be equipped with a warning signal determination unit 225 linked to ascertainment unit 215, which is developed to supply warning signal 160 with the aid of collision signal 256. Moreover, warning signal determination unit 225 may be connected to an output device 230 of user terminal 110, such as a loudspeaker or a screen, in order to output an acoustic or visual collision warning to the driver in response to warning signal 160.

Optionally, according to one further exemplary embodiment of the present invention, warning signal determination unit 225 is able to read in image signal 234 of further image sensor 120, so that warning signal 160 is ascertained with the aid of collision signal 256 and made available already at an even earlier instant using image signal 234, provided that information that indicates inattentiveness of the vehicle driver can be gathered from image signal 234. Output device 230 thus can output a warning to the driver correspondingly earlier in response to warning signal 160 if the driver shows inattentiveness.

According to one further exemplary embodiment of the present invention, device 200 may moreover be designed to output a telephoning signal 235 to warning determination unit 225 in response to an active telephone connection of user terminal 110. Like image signal 234, telephoning signal 235 may be used to provide an even earlier warning signal 160 using collision signal 256, so that the driver can be alerted to the looming collision at a correspondingly earlier instant in the event that the driver is not paying attention because of the telephone connection.

In addition or as an alternative, warning signal determination unit 225 may be designed to provide an activation signal 240 with the aid of collision signal 256. To do so, warning signal determination unit 225 may communicate with a vehicle safety system 245, which is situated outside user terminal unit 110 and installed in vehicle 100, for instance via a CAN bus of vehicle 100, to which user terminal 110 is connected by radio or via interface 140. In response to activation signal 240, vehicle safety system 245 may be activated.

According to one further exemplary embodiment of the present invention, read-in unit 205 may be connected to a satellite antenna 250, which is integrated into user terminal 110, for the read-in of a navigation satellite signal 255, in particular a GPS signal. In addition to the distance of vehicle 100 to object 105, ascertained with the aid of image signal 115, and based on navigation satellite signal 255, an own speed of vehicle 100 is ascertainable, so that the time that elapses until a collision occurs is able to be calculated in an especially precise manner. The own speed may be used when determining collision signal 256.

An exemplary embodiment of the present invention will be described in the following text with the aid of FIG. 2.

Mobile device 100, such as a smartphone, is designed to execute a driver assistance function, an automatic or an autonomous driving function. In addition, mobile device 110 is equipped with a surround sensor as image sensor 115, such as a camera. Mobile device 110 is furthermore developed to receive operating data 254, such as the speed, acceleration, steering angle or brake pressure of the vehicle. Depending on surround sensor 115 and operating data 254, the driver receives assistance signals in the form of warning signals 160 via mobile device 110, such as in the form of what is referred to as a forward collision warning (FCW), by which a warning is output about a collision with an object situated in the area in front of the vehicle. Mobile device 110 may optionally be developed for transmitting data such as information or actuation commands as activation signal 240 to the vehicle. In one further variant, mobile device 110 is able to detect a driver state with the aid of an inwardly oriented camera as further image sensor 120, so that an earlier warning of a collision risk may be given to the driver. Finally, one variant is possible in which mobile device 110 itself is able to detect vehicle movements, in particular with the aid of acceleration sensor 220.

Vehicle data 254 transmitted to mobile device 110 are utilized for suppressing a faulty warning of smartphone FCW 200 in the event that the driver is braking sufficiently hard to avoid a collision. This leads to better performance of system 200, for instance to fewer faulty warnings, and thus to higher acceptance among users.

In one optional variant, the steering angle of the vehicle is utilized for suppressing the FCW warning or collision warning if no collision risk exists.

In one further exemplary embodiment of the present invention the steering angle of the vehicle, the vehicle dimensions and detected lane demarcations are utilized for improving the FCW function.

In addition, mobile device 110 may be designed to transmit information and commands to the vehicle, for instance in order to activate the vehicle brake within the framework of an automatic emergency braking function as vehicle safety system 245.

The mobile device camera pointing toward the interior of vehicle 100 moreover may be used as further image sensor 120 for monitoring the driver. If the gaze wanders or sleepiness occurs, which can be detected by the eyelid movement of the driver, for instance, an earlier warning takes place than in cases where the eyes are pointing toward the camera or the driver is alert. The earlier warning alternatively may also take place when the driver is on the phone.

Instead of linking mobile user terminal 110 via interface 140 to the vehicle CAN for the read-in of driving state signal 254, mobile user terminal 110 may also utilize 6-D or 9-D acceleration sensors 220 integrated into mobile user terminal 110 in order to detect a deceleration of the vehicle. Based on this information, a faulty warning can be excluded, which in turn results in an improved performance of a smartphone FCW system 200.

The described communication paths may be combined.

Figure 3:
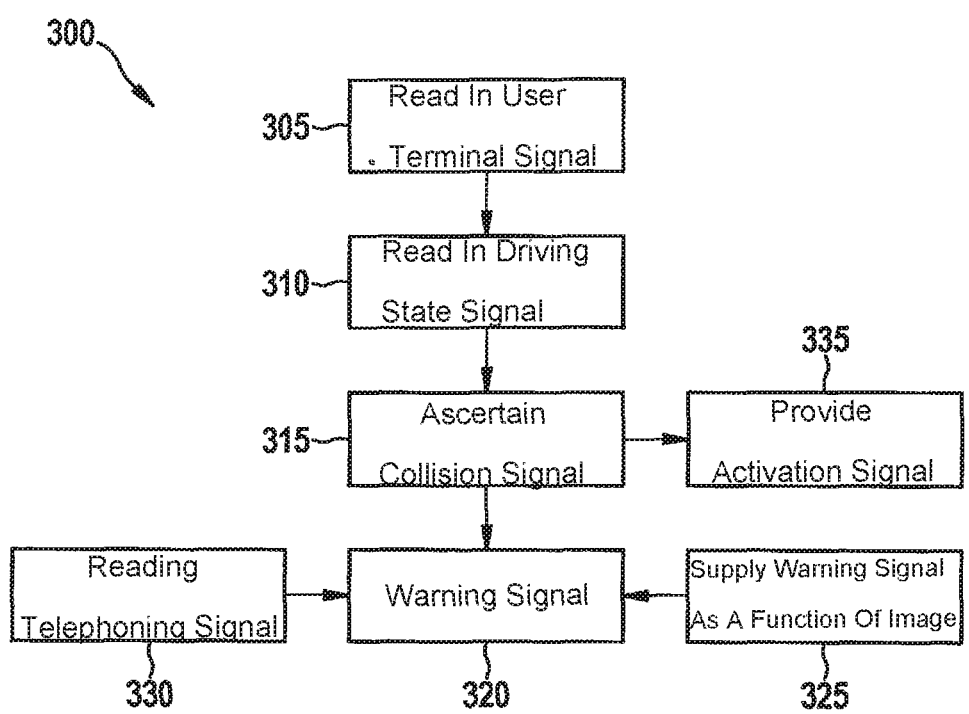
FIG. 3 shows a flow chart of a method for detecting a collision between a vehicle and an object while with the aid of a mobile user terminal which is able to be coupled to the vehicle according to one exemplary embodiment of the present invention.

FIG. 3 shows a method 300 for detecting a collision between a vehicle and an object using a mobile user terminal that is able to be coupled to be vehicle according to one exemplary embodiment of the present invention. The mobile user terminal may be the mobile user terminal illustrated in the preceding figures.

In a step 305, a user terminal signal for detecting the object is read in to begin with. The user terminal signal represents a measured variable which is output by an image sensor of the user terminal. A step 310 then takes step in parallel or in advance, during which a driving state signal for detecting a driving state of the vehicle is read in. The driving state signal represents a measured variable that is output by a vehicle sensor via an interface between the user terminal and the vehicle and/or an acceleration sensor of the user terminal. In a following step 315, a collision signal for indicating an imminent collision between the vehicle and the object is ascertained using the user terminal signal and the driving state signal.

According to one further exemplary embodiment of the present invention, method 300 includes an optional step 320 of providing a warning signal with the aid of the collision signal in order to output a collision warning via the user terminal.

Moreover, method 300 may include an additional step 325 of reading in an image signal in order to detect a state of a driver. The image signal may represent a measured variable which is output by a further image sensor of the user terminal. Step 325 of supplying the warning signal may furthermore be implemented as a function of the image signal.

According to one further exemplary embodiment of the present invention, a step 330 of reading in a telephoning signal, which represents an active telephone connection of the user terminal, may take place. Step 320 of supplying the warning signal in response to the telephoning signal may be carried out earlier.

Finally, in a further variant, method 300 may include a step 335, during which an activation signal is to the interface between the user terminal and the vehicle with the aid of the collision signal, so as to activate a vehicle safety system.

The exemplary embodiments described and shown in the figures have been selected merely as examples. Different exemplary embodiments are combinable with one another, either completely or with regard to individual features. An exemplary embodiment may also be supplemented by features from another exemplary embodiment. Furthermore, method steps according to the present invention may be repeated or executed in a sequence other than the one described. If an exemplary embodiment includes an "and/or" linkage between a first feature and a second feature, this is to be understood to mean that the exemplary embodiment according to one specific embodiment has both the first feature and the second feature, and according to another specific embodiment, either has only the first feature or only the second feature.

What is claimed is:

1. A method for detecting an imminent collision between a vehicle and an object situated in front of the vehicle using a mobile user terminal which is able to be coupled to the vehicle, the method comprising:
reading in a user terminal signal for detecting the object, the user terminal signal representing a signal provided by an image sensor of the user terminal;
ascertaining, based on at least the user terminal signal, a collision signal for indicating an imminent collision between the vehicle and the object; and
outputting, via the user terminal, a forward collision warning signal as a function of at least the collision signal and a detected driver action, wherein outputting of the forward collision warning signal is suppressed when the detected driver action is determined to be sufficient to avoid a collision, wherein the mobile user terminal utilizes at least one of 6-D and 9-D acceleration sensors integrated into the mobile user terminal to detect a deceleration of the vehicle associated with a driver braking action in order to determine whether the forward collision warning signal is to be suppressed.

2. The method as recited in claim 1, wherein in the step of ascertaining the collision signal, a collision danger is ascertained using the user terminal signal and plausibilized with the aid of a driving state signal in order to ascertain the collision signal.

3. The method as recited in claim 1, further comprising:
supplying, based on the collision signal, an activation signal to an interface between the user terminal and the vehicle in order to activate a vehicle safety system.

4. The method as recited in claim 1, further comprising:
reading in a driving state signal for detecting a driving state of the vehicle, the driving state signal representing a measured variable which is output by at least one of (i) a vehicle sensor via an interface between the user terminal and the vehicle and (ii) an acceleration sensor of the user terminal.

5. The method as recited in claim 4, wherein the collision signal is ascertained based on the user terminal signal and the driving state signal.

6. The method as recited in claim 4, wherein a steering angle of the vehicle is utilized in order to determine whether the forward collision warning signal is to be suppressed.

7. The method as recited in claim 4, wherein the forward collision warning signal is outputted as a function of at least the collision signal, a steering angle of the vehicle, and a detected lane marking.

8. A non-transitory computer-readable data storage medium storing a computer program having program codes which, when executed on a computer, perform a method for detecting an imminent collision between a vehicle and an object situated in front of the vehicle using a mobile user terminal which is able to be coupled to the vehicle, the method comprising:
reading in a user terminal signal for detecting the object, the user terminal signal representing a signal provided by an image sensor of the user terminal;
ascertaining, based on at least the user terminal signal, a collision signal for indicating an imminent collision between the vehicle and the object; and
outputting, via the user terminal, a forward collision warning signal as a function of at least the collision signal and a detected driver action, wherein outputting of the forward collision warning signal is suppressed when the detected driver action is determined to be sufficient to avoid a collision, wherein the mobile user terminal utilizes at least one of 6-D and 9-D acceleration sensors integrated into the mobile user terminal to detect a deceleration of the vehicle associated with a driver braking action in order to determine whether the forward collision warning signal is to be suppressed.

9. A device for detecting a collision between a vehicle and an object, the device being a part of a mobile user terminal configured to be selectively coupled to the vehicle, the device comprising:
a read-in unit configured to read in a user terminal signal for detecting the object, the user terminal signal representing a signal provided by an image sensor of the mobile user terminal; and
a control unit configured to:
ascertain, based on at least the user terminal signal, a collision signal for indicating an imminent collision between the vehicle and the object; and output a forward collision warning signal as a function of at least the collision signal and a detected driver action, wherein outputting of the forward collision warning signal is suppressed when the detected driver action is determined to be sufficient to avoid a collision, wherein the mobile user terminal utilizes at least one of 6-D and 9-D acceleration sensors integrated into the mobile user terminal to detect a deceleration of the vehicle associated with a driver braking action in order to determine whether the forward collision warning signal is to be suppressed.

* * * * *